(12) United States Patent
Finney et al.

(10) Patent No.: US 7,326,107 B2
(45) Date of Patent: Feb. 5, 2008

(54) DEDAGGING IMPLEMENT AND ROTOR THEREOF

(75) Inventors: Andrew Leslie Finney, Queensland (AU); John Ellard Hart, Queensland (AU); Darryl John Heidke, Queensland (AU); Raymond Malcolm White, Queensland (AU)

(73) Assignee: Meat & Livestock Australia Limited, North Sydney (AU)

( * ) Notice: Subject to any disclaimer, the term of this patent is extended or adjusted under 35 U.S.C. 154(b) by 224 days.

(21) Appl. No.: 10/493,085

(22) PCT Filed: Oct. 18, 2002

(86) PCT No.: PCT/AU02/01421

§ 371 (c)(1),
(2), (4) Date: Nov. 2, 2004

(87) PCT Pub. No.: WO03/032738

PCT Pub. Date: Apr. 24, 2003

(65) Prior Publication Data

US 2005/0107023 A1 May 19, 2005

(30) Foreign Application Priority Data

Oct. 19, 2001 (AU) .................................. PR8380

(51) Int. Cl.
*A22C 25/02* (2006.01)
(52) U.S. Cl. ..................................................... 452/86
(58) Field of Classification Search ............ 452/82–84, 452/88, 94, 97, 98, 117, 101, 119, 127–130, 452/132, 133; 99/588, 585, 584, 589, 591; 119/603, 604, 606, 608–610; 30/276, 256
See application file for complete search history.

(56) References Cited

U.S. PATENT DOCUMENTS

| | | | | |
|---|---|---|---|---|
| 4,071,923 A | * | 2/1978 | Smith | 452/133 |
| 4,186,461 A | * | 2/1980 | Leining | 452/133 |
| 4,451,953 A | * | 6/1984 | Leining | 452/133 |
| 4,631,780 A | * | 12/1986 | Leining | 452/133 |
| 4,779,572 A | * | 10/1988 | Freulon | 119/604 |

(Continued)

FOREIGN PATENT DOCUMENTS

| | | |
|---|---|---|
| EP | 1 055 368 A1 | 11/2000 |
| WO | WO 02/26045 A1 | 4/2002 |

OTHER PUBLICATIONS

International Search Report dated Nov. 11, 2002 received in international (PCT) application No. PCT/AU02/01421.
International Preliminary Examination Report dated Jan. 22, 2004 received in international (PCT) application No. PCT/AU02/01421.

*Primary Examiner*—Thomas Price
(74) *Attorney, Agent, or Firm*—Marshall Gerstein & Borun LLP

(57) ABSTRACT

A dedagging implement including a body (2), a rotor (4) supported on the body (2) for rotation about an axis and having radially outwardly projecting lobes (6) for removing dag from a carcass, a liquid supply means located on the body (2), said liquid supply means being configured to direct a flow of liquid at the lobes (6) and an air supply means located on the body (2), said air supply means being configured to direct air flow at, or in close proximity to, the lobes (6). The present invention also provides a dedagging system having a dedagging implement and a vacuum waste collection system. The dedagging implement and/or dedagging system is useful for removing dag from an animal carcass.

15 Claims, 11 Drawing Sheets

U.S. PATENT DOCUMENTS 4,993,112 A * 2/1991 Burnett et al. ............... 452/134
5,482,503 A    1/1996 Scott et al. ................. 452/173
5,525,101 A * 6/1996 Soderlind ................... 452/135
5,813,904 A * 9/1998 Aslanis et al. .............. 452/133

* cited by examiner

DEDAGGING IMPLEMENT AND ROTOR THEREOF

FIELD OF INVENTION

The present invention relates to an implement for removing dag from an animal carcass—that is, for dedagging the carcass.

BACKGROUND

The term "dag" is to be interpreted in this specification to mean hair and other material, such as mud and dung, which has become hardened or clotted to form ball-like masses which are attached to the carcass of an animal.

Where reference is made in this specification to a single integral element, this is to be interpreted as including an element made up of separate parts which are joined together in a permanent manner such as by welding or permanent bonding. Where reference is made to a cylinder, this is to be understood as a cylinder of circular cross-section. The term "cylindrical" is to be understood in a corresponding sense.

The invention has been developed primarily for removing dags from carcasses in abattoirs and will be described hereinafter with reference to that application. However, it will be appreciated that the invention is not limited to that particular field of use.

A known dedagging implement includes a rotor having lobes for wearing, and cutting, away dag from a carcass. Certain dag, known as winter dag, has a brittle, hard outer surface which can contain dry, dust-like material. As the rotor removes the dag, the outer surface is generally broken and the dust-like contents contaminate the implement and foul the rotor. Some of the dag remains attached to the lobes and only becomes dislodged when the lobes undergo a further revolution and contact the carcass again. Thus, the dag is redeposited on the carcass. Any liquid with which the dag material mixes causes the material to form a mud smear on the carcass.

Sticking of the dag to the rotor is particularly prevalent in the case of dag known as summer dag. Summer dag is softer than winter dag, and is of a sticky, toffee-like consistency. As the rotor turns, the dag, which has been at least partially broken up, becomes smeared on the carcass by the lobe. Some of the dag does, however, become dislodged from the rotor as it rotates, and is flung onto the inner walls of the implement, to which it sticks, thereby fouling the equipment.

Consequently, the dedagging process using such implements is not as efficient or effective as it should be. This causes difficulties in satisfying existing food hygiene requirements.

Another disadvantage of existing dedagging implements is that the broken-up dags enter, and contaminate, bearings which support the implements' rotors. This necessitates time consuming, expensive and complicated maintenance procedures.

Existing implements also suffer disadvantages relating to safety of use. The lobes of the rotors project though openings in the implements' housings. Should an implement be activated while facing towards an operator, parts of the operator's body can inadvertently come into contact with the lobes. This can prove dangerous or even fatal.

A further disadvantage of known dedagging implements relates to their having rotors which include shafts and separate lobe elements. The shafts have central portions of hexagonal cross-section. Each element includes a central ring having an aperture shaped complimentarily with respect to the shaft, and the elements are slidingly received on the shafts. Integral lobe fingers project radially outwardly from the rings. Dag material penetrates between adjacent elements forcing them apart. Some of the material is deposited on the axially outer sides of the outermost elements. As the elements are forced apart, this outer material is caused to enter, and contaminate, the bearings. Furthermore, the lodging of contaminants between the elements affects the balance of the rotors, and this contributes to wear of the bearings. Once again, time consuming, expensive and complicated maintenance is required.

Another disadvantage of known dedagging implements relates to the design of their rotors. The rotors of certain known implements have lobes which, although effective at removing dag material from a carcass, are shaped so as not to fling the dag away from the lobes effectively. Thus, the dag tends to stick to, and accumulate on, the rotor. In the case of other known implements, the rotor has lobes positioned successively along the axis of the rotor, adjacent lobes being circumferentially spaced from each other and shaped such that dag material tends to be deflected so as to bypass the lobes as they rotate, rather than being "caught" by the lobes.

A further disadvantage of known dedagging implements relates to their having rotors which are actuated by compressed air. This method of actuation produces insufficient power and results in unacceptable equipment noise levels.

Known dedagging implements use vacuum systems to evacuate contaminants that have been removed from carcases. A known vacuum system includes a vacuum tank and a relatively low powered vacuum pump. The pump is used to produce a vacuum pressure in the tank while a valve between the tank and the implement is closed. When the valve is opened, the initial vacuum pressure in the tank is sufficient to cause a strong suction effect to remove dag material from the implement. However, as the pressure in the tank reduces and reaches equilibrium with the suction pressure of the vacuum pump itself, the effectiveness of the suction decreases and becomes inadequate.

It is an object of the present invention to overcome or ameliorate at least one of the disadvantages of the prior art or to provide an alternative.

SUMMARY OF THE INVENTION

According to a first aspect of the invention there is provided a dedagging implement including:

a body;

a rotor supported on the body for rotation about an axis and having radially outwardly projecting lobes for removing dag from a carcass;

a liquid supply means located on the body, said liquid supply means being configured to direct a flow of liquid at the lobes;

an air supply means located on the body, said air supply means being configured to direct air flow at, or in close proximity to, the lobes.

Preferably, the liquid supply means is configured to direct liquid at a portion of the lobes which collects dag and has dag deposited thereon in use.

Preferably, the air supply means is configured to direct air flow at, or in close proximity to, the radial outermost extremity of the lobes.

The liquid and air flows perform separate functions, enabling the present invention to remove effectively all types of dag from a carcass. The liquid flow, typically water, loosens and dilutes dag, typically having a toffee-like consistency, which is stuck to a portion of the lobe. As the rotor rotates, the centrifugal force generated flings the dag to the outermost extremity of the lobe, whereupon the air flow dries the dag into a dusty material and removes it from the lobe.

Preferably, the liquid and air supply means are configured to direct the liquid flow at least partially in an opposite direction to the direction in which the lobes are moving. Thus, the liquid and air flows are directed onto the lobes with maximum force, thereby producing a maximal effect in dislodging dag attached to the lobes.

Preferably, the liquid and air supply means are configured for directing the liquid and air flows along respective intersecting liquid and air paths.

Preferably, the body defines a housing having an outlet for connection to vacuum suction means, the rotor being at least partially within the housing. Preferably, the air supply means is configured to direct the air flow substantially towards the outlet. This has the effect of nullifying the centrifugal air flow generated by the rotating lobes, thereby maximising the amount of vacuum. It also has the effect of directed dag waste into a waste collection region rather than allowing it to rotate with the lobe to which it is attached and fling back onto the animal carcass.

Preferably, the liquid supply means includes a liquid supply pipe extending across the housing parallel to the axis, the liquid supply pipe having at least one lateral aperture for projecting liquid along the liquid path. More preferably, the liquid supply pipe has a plurality of apertures arranged in series, each aligned with a respective lobe.

Preferably, the air supply means includes an air supply pipe extending across the housing parallel to the axis, the air supply pipe having at least one lateral aperture for projecting air along the air path. More preferably, the air supply pipe has a plurality of apertures arranged in series, each aligned with a respective lobe.

In a preferred embodiment, the rotor and lobes constitute a single integral element as herein defined. A single integral element is advantageous, because it avoids dags being trapped in between the rotor shaft and the lobes.

Preferably, the rotor is supported on the body by a bearing sealed from the lobes by a seal, the implement including liquid flushing means for directing a flow of liquid at the rotor adjacent to the seal for flushing dag material from the rotor to inhibit contamination of the bearing.

Preferably, the rotor has two opposite ends and is supported by a respective said bearing at or adjacent to each end.

In a preferred embodiment, the rotor is supported on the body by at least one bearing and includes a barrier adjacent to the bearing for obstructing passage of dag material from the lobes to the bearing, thereby inhibiting contamination of the bearing.

Preferably, the rotor is supported by a pair of bearings, each bearing having a corresponding barrier adjacent thereto. Preferably, each barrier is a disk-like formation.

Preferably, a leading face of the respective lobe adjacent to each disk-like formation defines a radially extending curve angled for directing dag material contacting the face at least partially away from the adjacent disk-like formation. Preferably also, the respective lobe is integral along its full radial extent with the adjacent disk-like formation.

Preferably, the or each bearing is located in a separate bearing housing.

In a preferred embodiment, the dedagging implement further includes a drive means for rotating the rotor. Preferably, the drive means is a hydraulic motor.

In one embodiment, the dedagging implement further includes two actuating switches, wherein both of the switches must be deployed to actuate the drive means.

Preferably, deployment of each switch must occur within a predetermined time from deployment of the other switch to actuate the drive means. The predetermined time is preferably substantially one second.

In a preferred embodiment, the implement further includes two spaced-apart handles for supporting the implement, each switch being disposed on a respective handle. The implement preferably has a front side and a rear side, the rotor being disposed for removal of the dag from the carcass at or adjacent to the front side and each switch including an actuating lever disposed substantially at the front side of the respective handle and configured to be deployed by movement of the lever in a rearward direction.

In an alternative embodiment, the dedagging implement is mounted on a robotic arm, said robotic arm being controlled by a computer programmed to operate the dedagging implement. The robotic arm, together with a suitably programmed computer, may be used to control movement of the implement, as well as actuation.

Preferably, the implement further includes liquid spraying means mounted to the body and configured for spraying liquid directly onto a carcass in use.

According to a preferred aspect of the present invention, the rotor is configured to be supported for rotation about an axis in an operational direction of rotation and including at least one lobe having a leading face with respect to said operational direction, said face extending from a first end corresponding to a radially outer extremity of the rotor to a second end closer to said axis, and being configured to facilitate the outward movement of dag along the face by centrifugal force from rotation of the rotor.

Preferably, the configuration of said face facilitates said outward movement by being substantially straight along its extent in a direction from said first end to said second end.

In a preferred embodiment, said face intersects a line extending in a plane perpendicular to said axis and radially from said axis to said first end, at an angle of between 10 degrees and 25 degrees.

Preferably, said face is substantially planar in a direction parallel to said axis.

More preferably, said face defines an elongate groove therein extending from said first end towards said second end. Even more preferably, said face defines a pair of straight elongate coplanar planar portions disposed on opposite sides of said groove and extending from said first end towards said second end.

Preferably, each said planar portion intersects a line extending in a plane perpendicular to said axis and radially from said axis to said first end, at an angle of 15 degrees. Preferably, also, a line running along the trough of said groove intersects a line extending in a plane perpendicular to said axis and radially from said axis to said first end, at an angle of 20 degrees.

The rotor preferably includes a plurality of said lobes positioned successively along said axis, each lobe being spaced circumferentially about said axis from each immediately adjacent lobe, each lobe having a pair of opposed planar sidewalls intersected by the respective face, the interposed sidewalls of each pair of adjacent lobes being coplanar with respect to each other.

Preferably, each lobe includes a radially outer surface constituting the first end of the lobe, said surface being part of a cylinder which is coaxial with said axis.

Preferably, the thickness of each lobe, between the face and an opposed surface of the lobe, tapers in a direction from said first end towards said second end.

In a preferred embodiment, the implement is connected to a vacuum waste collection system, preferably a cyclonic vacuum system. Hence, the present invention further provides a dedagging system including a dedagging implement and a vacuum waste collection system connected to the implement. The vacuum waste collection system is for receiving dag removed from a carcass and attached to the lobes.

Preferably, the vacuum waste collection system includes a waste collection chamber having an inlet opening and an outlet opening and closure means for selectively closing the openings, the system being configured to permit dag material to be drawn from the implement into the chamber through the inlet opening during a first phase while the outlet opening is closed by the closure means, and to permit removal of dag material from the chamber through the outlet opening during a second phase while the inlet opening is closed by the closure means. Preferably, the system is configured to alternate the phases.

BRIEF DESCRIPTION OF THE DRAWINGS

A preferred embodiment of the invention will now be described, by way of example only, with reference to the accompanying drawings in which.

DETAILED DESCRIPTION

Figure 1:
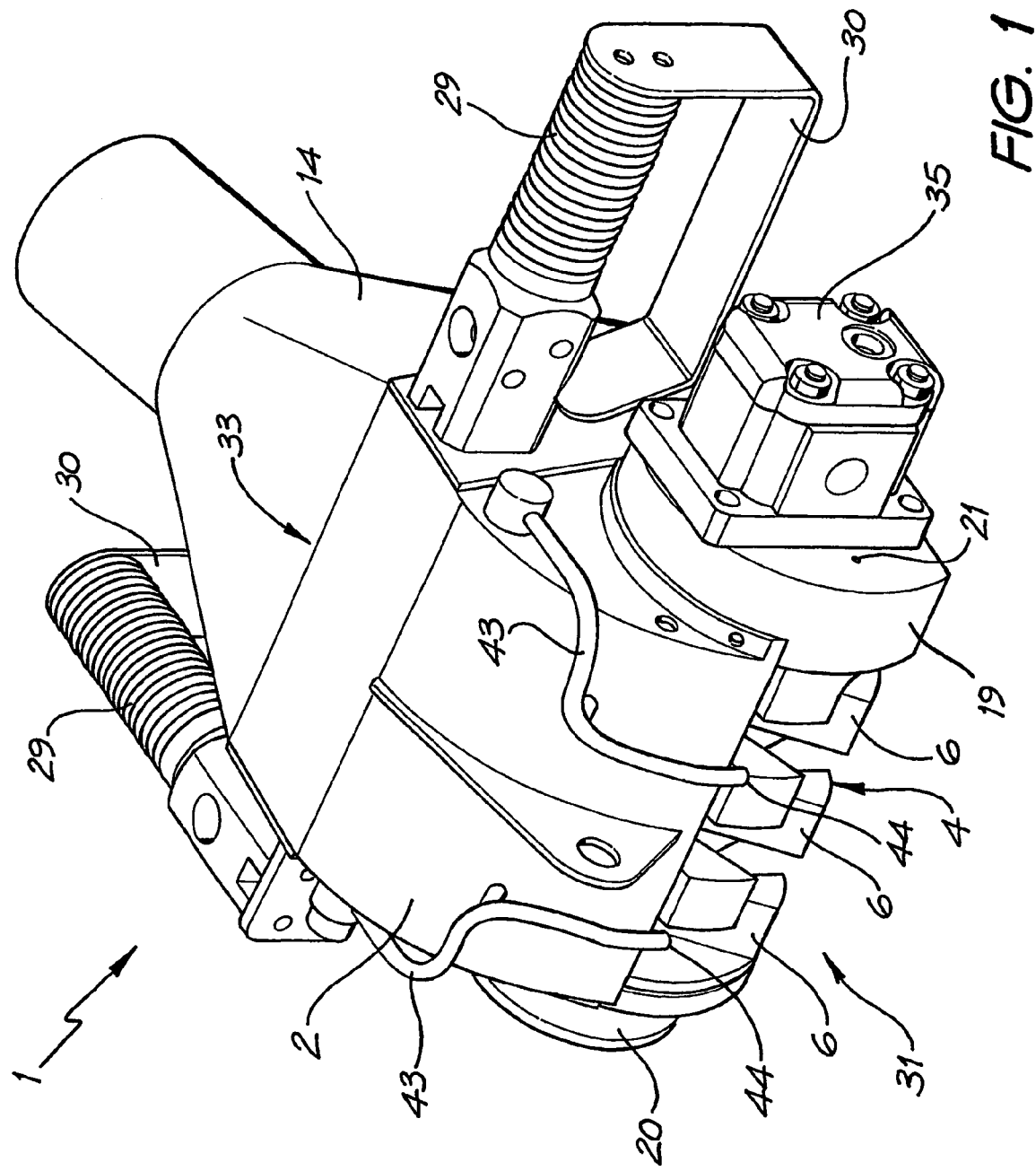
FIG. 1 is a schematic perspective top, rear, left-hand view of a dedagging implement according to an embodiment of the invention.
Figure 2:
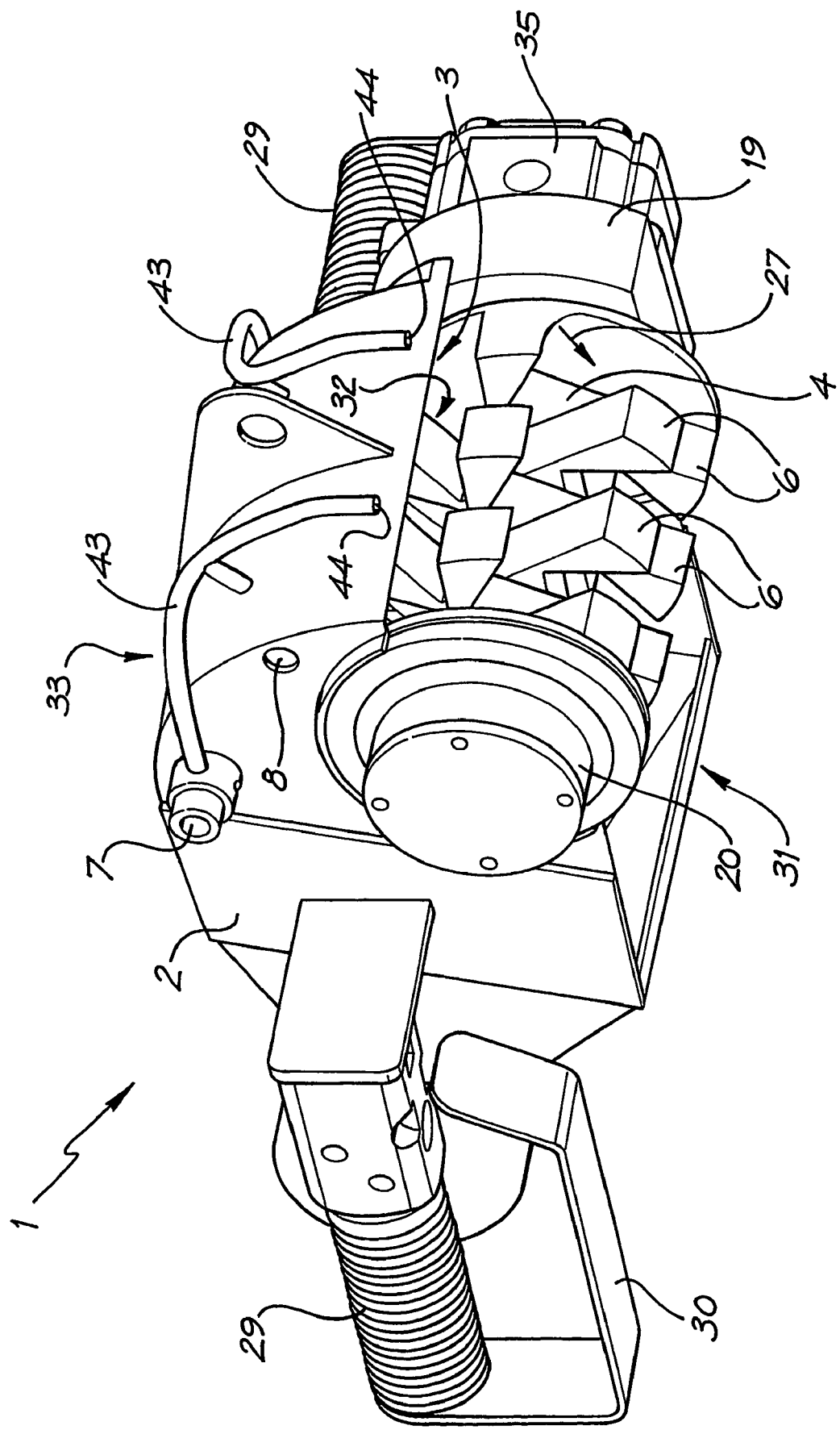
FIG. 2 is a schematic perspective top, front, right-hand view of the dedagging implement.
Figure 3:
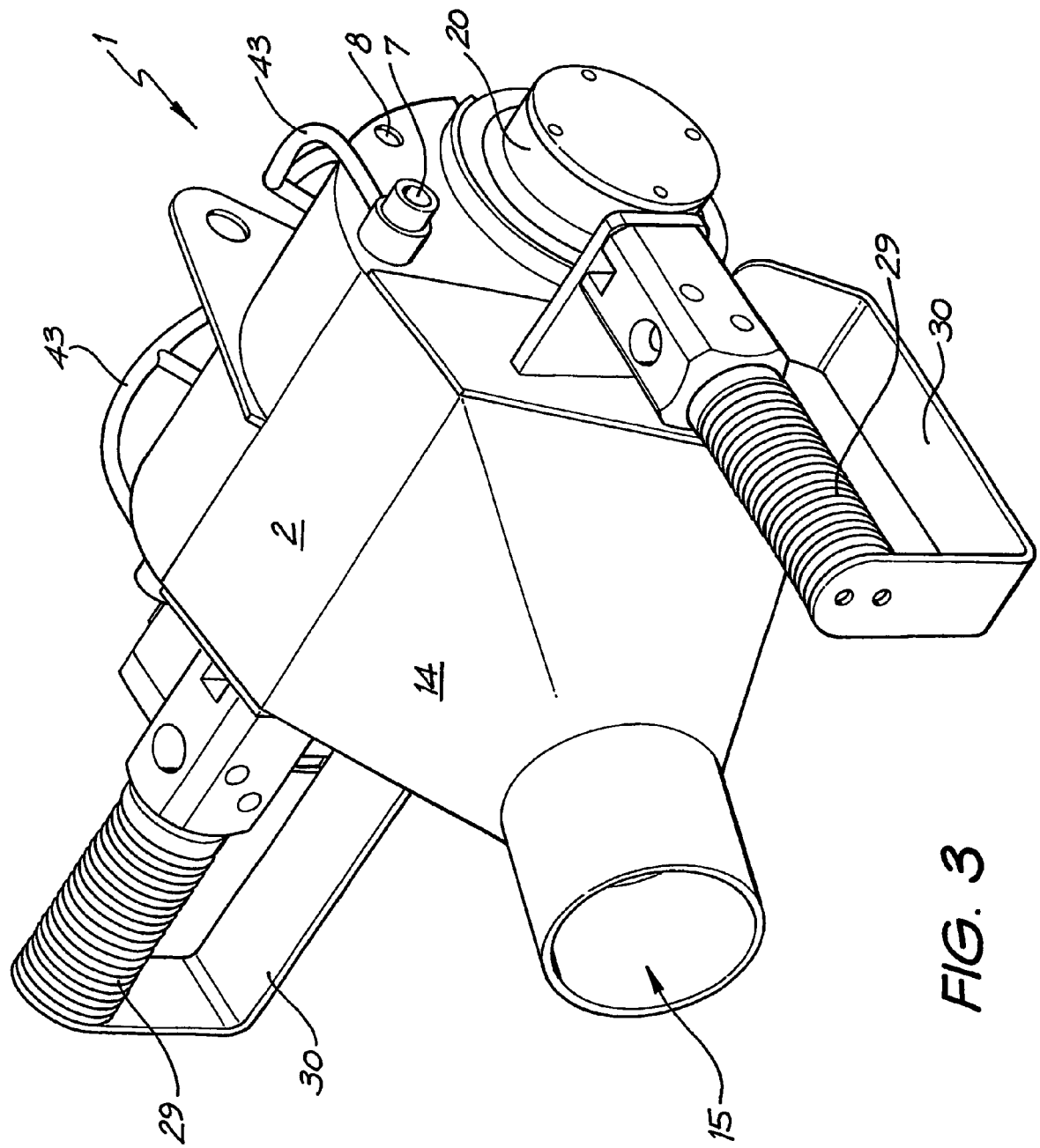
FIG. 3 is a schematic perspective bottom, rear, right-hand view of the dedagging implement.

Referring to the drawings, dedagging implement 1 includes a body 2 of stainless steel defining a housing 3. A rotor 4 is supported for rotation about an axis 5 in the housing. The rotor has eighteen radially outwardly projecting lobes 6 for removing dag from the carcass of an animal, as will be described in more detail below. Liquid supply means in the form of a water supply pipe 7 and an air supply pipe 8 are provided for dislodging dag from lobes 6. Each of the pipes 7 and 8 extends across housing 3 parallel to the axis 5. Water supply pipe 7 has a series of lateral apertures 9 for projecting a flow of water at rotor 4, each aperture being aligned with a respective lobe 6. Similarly, air supply pipe 8 has a series of lateral apertures 10 for projecting a flow of air adjacent to rotor 4, each aperture being aligned with a respective lobe 6.

Apertures 9 and 10 are arranged generally to direct the flows of water and air towards or adjacent to a portion of the lobes which, at any time, is disposed within an arc A-B about axis 5. It will be appreciated that the position of the arc is such that the lobes within the arc are moving generally in an opposite direction to the water and air flows as rotor 4 is rotating in its operational direction 11.

Specifically, apertures 9 are arranged to direct the water flow along a path represented by line 12, directly at those lobes 6 which at any time are within the arc. Apertures 10 are arranged to direct the air flow along a path represented by line 13 in close proximity to the radially outer extremities of those lobes 6 which at any time are within arc A-B, such that the air just touches, or closely bypasses—for example by 1 mm—the lobes. The flow of air in such close proximity to the extremities of the lobes 6 causes a whining or humming sound to be emitted. Accordingly, the desired direction of the air flow may be achieved by means of "tuning"—that is, by achieving a sound indicative of the desired conditions.

Housing 3 has a vacuum chute 14 and a vacuum outlet 15 for connection to vacuum suction means in the form of a cyclone vacuum system. It will be noted that paths 12 and 13 intersect each other such that the air flow may deflect at least some of the water flow towards outlet 15. The vacuum system will be discussed in more detail below.

Rotor 4 and lobes 6 are machined from stainless steel and therefore constitute a single integral element. The rotor is supported at its two opposite ends 16 and 17 on body 2 by bearings 18 located in aluminium housings 19 and 20.

Figure 9:
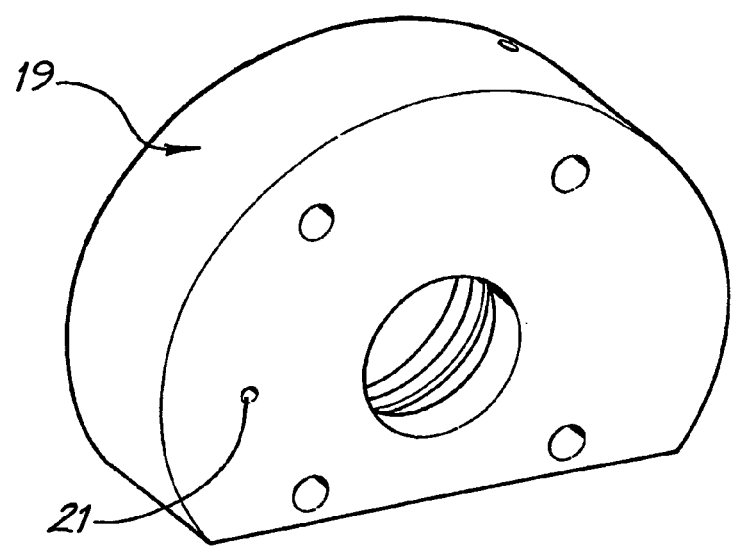
FIG. 9 is a perspective view of a bearing housing of the dedagging implement.
Figure 10:
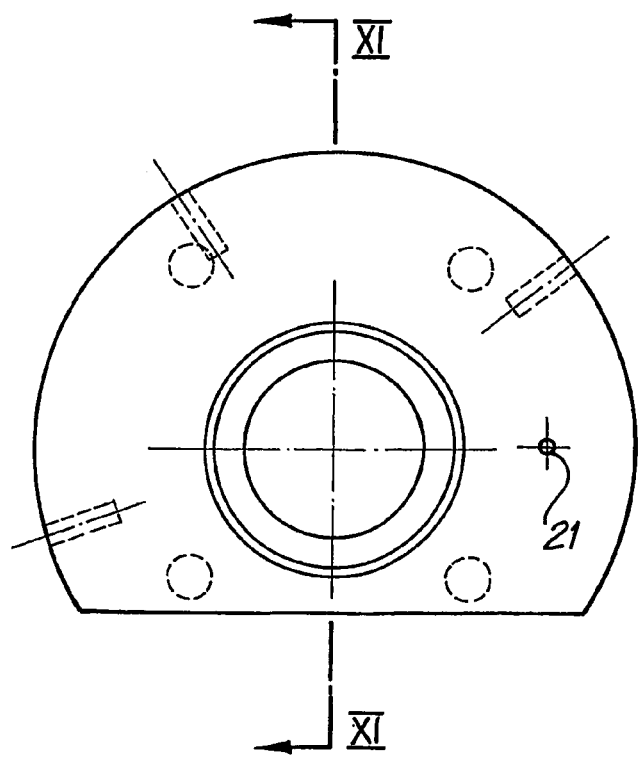
FIG. 10 is a side elevation of the housing of FIG. 9.
Figure 11:
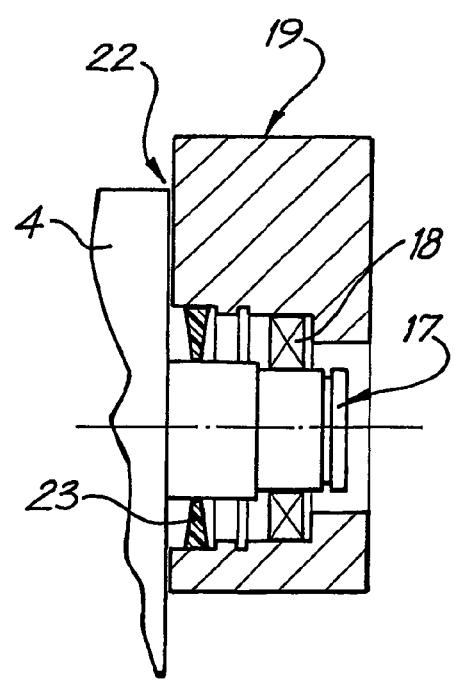
FIG. 11 is a section along line XI-XI through the housing of FIG. 9, including the rotor.
Figure 12:
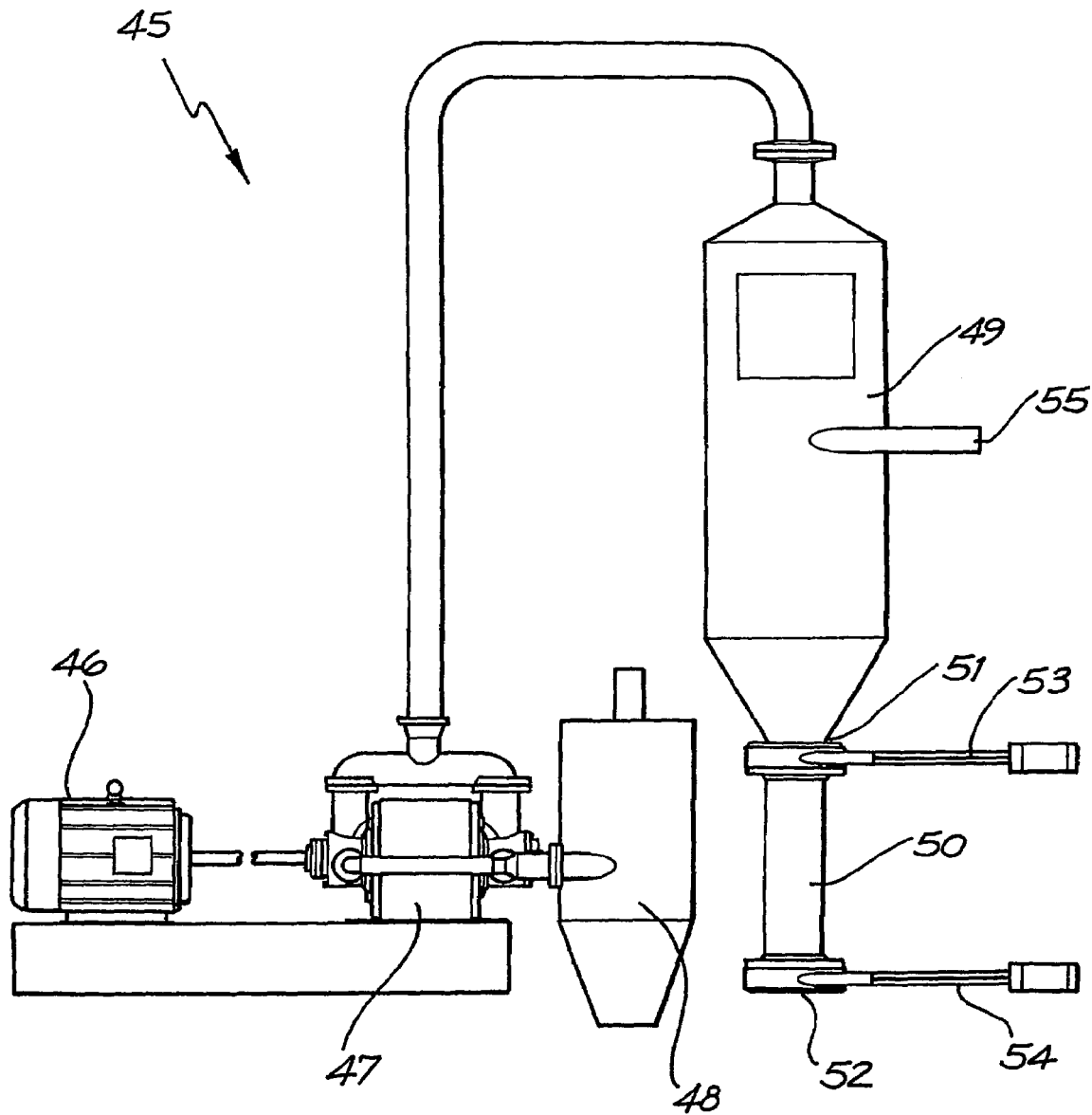
FIG. 12 is an elevation of a cyclonic vacuum system.

Each of the housings 19 and 20 has a passage 21 for directing flushing water to the space 22 between the housing and the lobes (only the details of housing 19 being shown—see FIGS. 9, 10 and 11.) This water flushes dag material removed from a carcass, and other contaminants, from rotor 4 and towards vacuum chute 14 to prevent such matter reaching and penetrating bearings 18.

Seals in the form of lip seals 23 are disposed between lobes 6 and bearings 18, adjacent to the bearings. The seals inhibit movement, to the bearings, of dag material and the flushing water supplied though passage 21, to further protect the bearings from contamination.

Rotor 4 includes a disk-like formation 24 adjacent to each of ends 16 and 17. Because dag material removed from a carcass and sticking to lobes 6 would have to circumvent formations 24 to pass from the lobes to bearings 18, formations 24 assist in obstructing such passage of the dag material to the bearings. Formations 24 therefore serve to further protect the bearings from contamination.

It will be appreciated that the respective lobe 6 adjacent to each formation 24 is integral along its full radial extent with the formation. This prevents ingress of contamination between these lobes and the formations.

The joint 25 between each formation and its respective lobe 6 is radiused at the leading side of the lobe with respect to its rotation about axis 5. In effect, therefore, the leading face 26 of each of these lobes defines a curve which extends radially with respect to the lobe. The angle of the curve is effective for directing dag material which contacts faces 26 away from the respective formation 24 as indicated by arrows 27. This limits the extent to which dag material, which gets flung from lobes 6 as rotor 4 rotates, contacts and sticks to the inwardly tapering walls 28 of vacuum chute 14. This feature therefore contributes to effective evacuating of dag material from implement 1.

Figure 16:
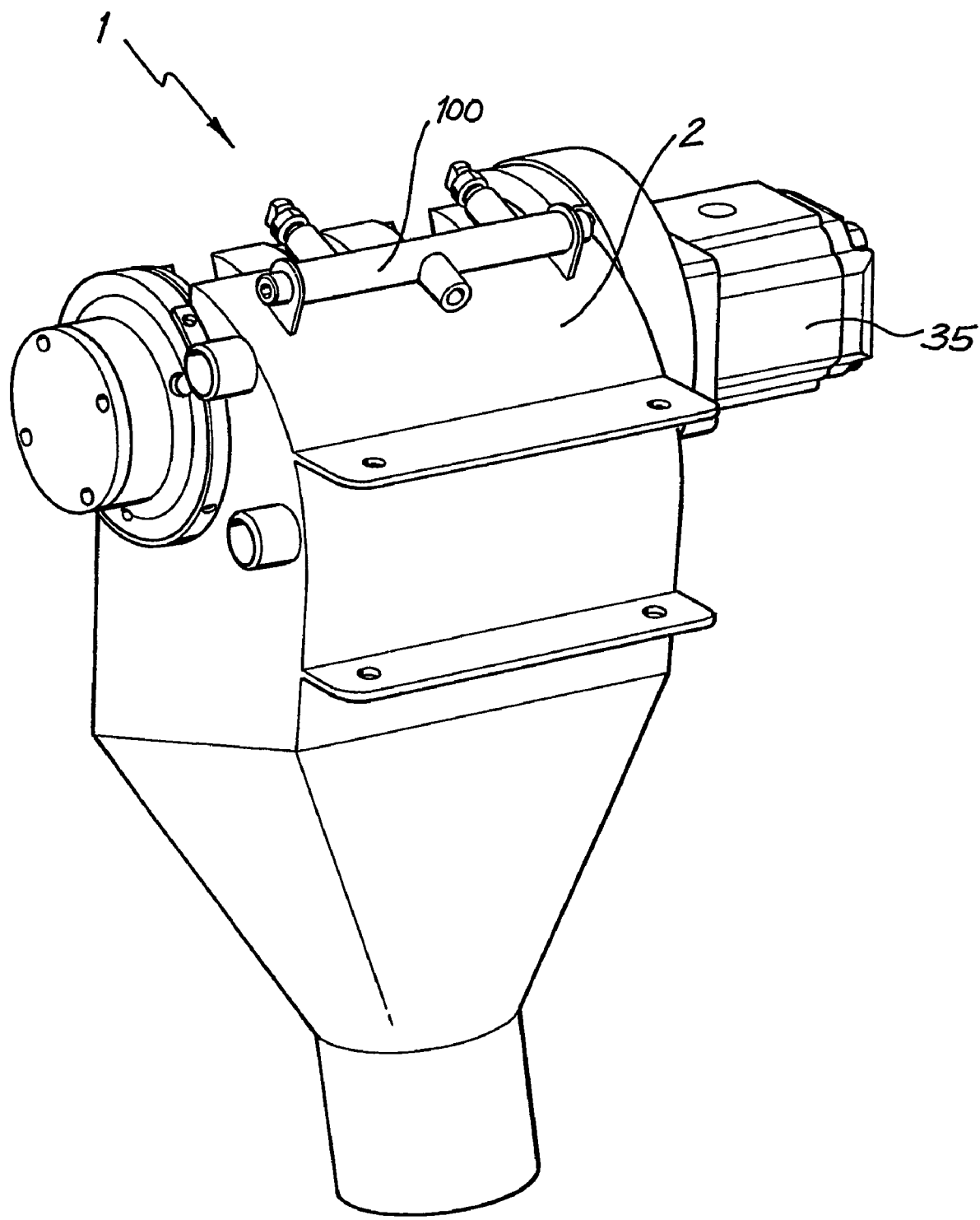
FIG. 16 is a perspective view of the dedagging implement having a robotic arm attachment.

Implement 1 is provided with aluminium handles 29 with hand guards 30, for holding the implement aloft in use. It will be appreciated that lobes 6 protrude from housing 3 on the front side 31 of the implement through an opening 32 and that the rear side 33 of the implement is directed towards an operator in use. Handles 29 are spaced apart and are positioned so that two-handed use is required. This ensures that the operator's hands are kept clear of lobes 6. [In an alternative arrangement (see FIG. 16), the implement 1 is connected to a robotic arm (not shown) by a robotic arm mounting 100 fixed to the body 2. The robotic arm may be connected to the mounting 100 via a flexible wrist (not shown). The robotic arm controls the movement and/or actuation of the implement 1. Hence, the robotic arm, controlled by a suitably programmed computer, obviates the need for handles 29 and, optionally, actuating switches 34 in a fully automated dedagging system].

Figure 4:
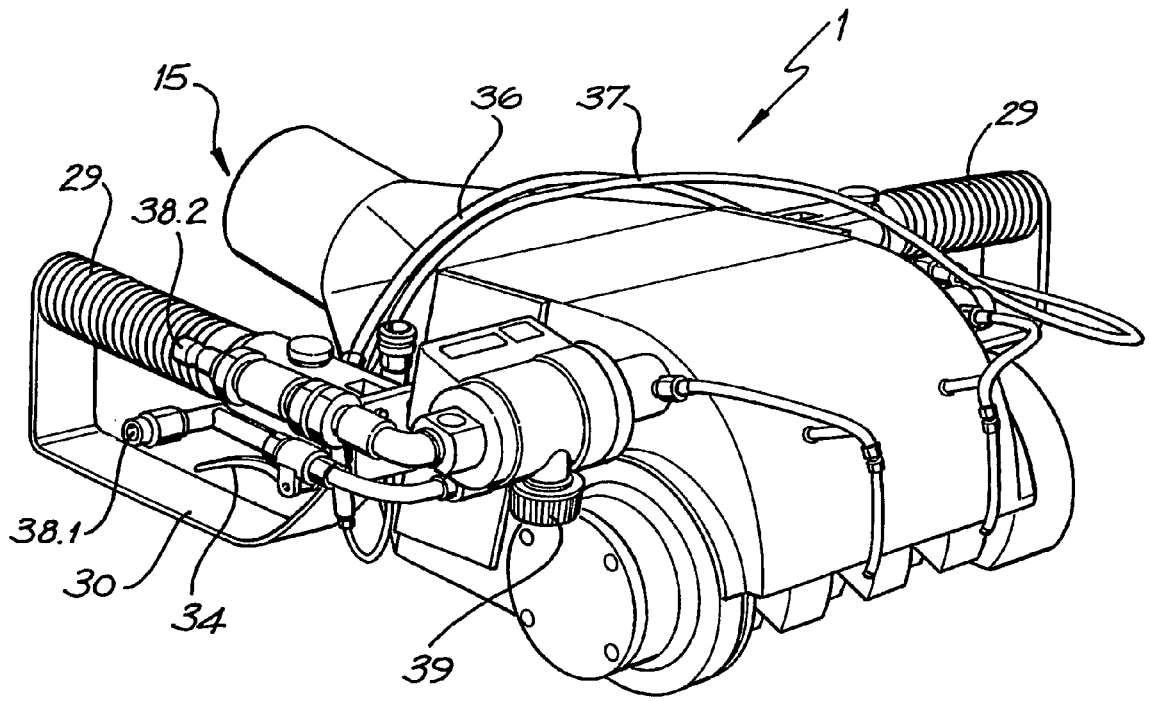
FIG. 4 is a perspective top, rear, right-hand view of the dedagging implement.
Figure 5:
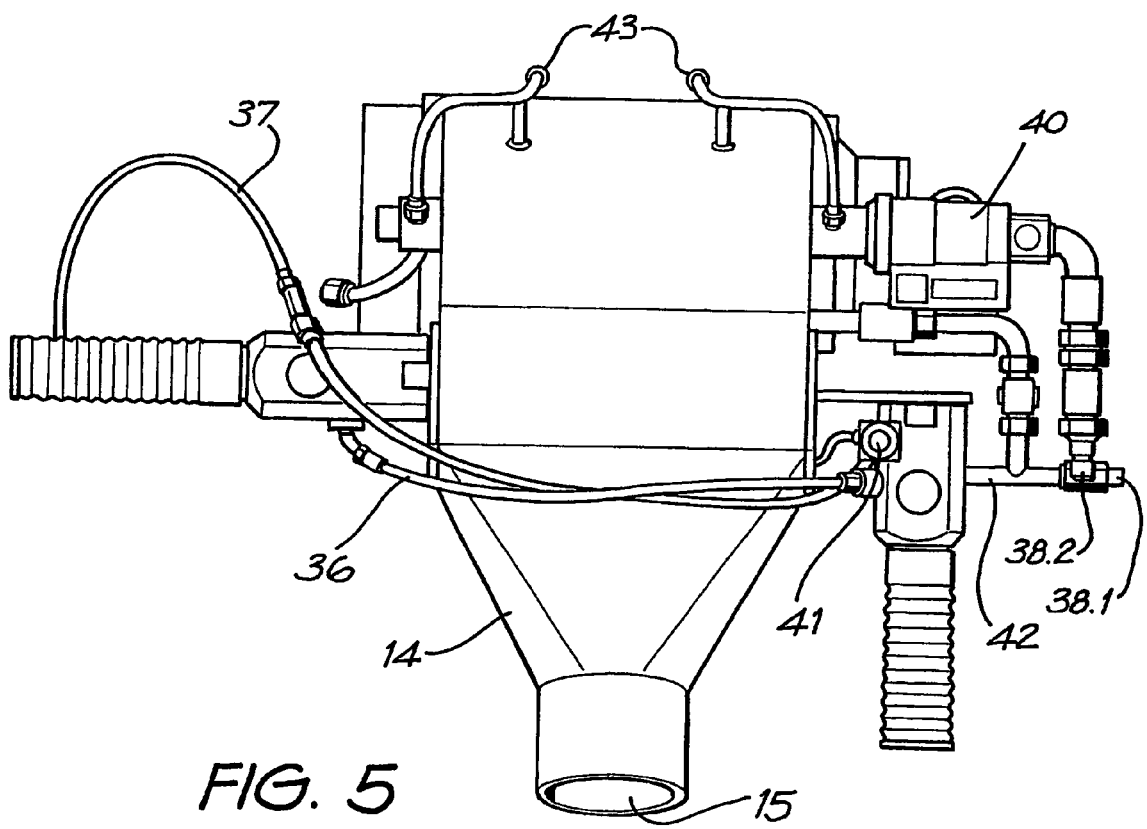
FIG. 5 is a rear view of the dedagging implement.
Figure 6:
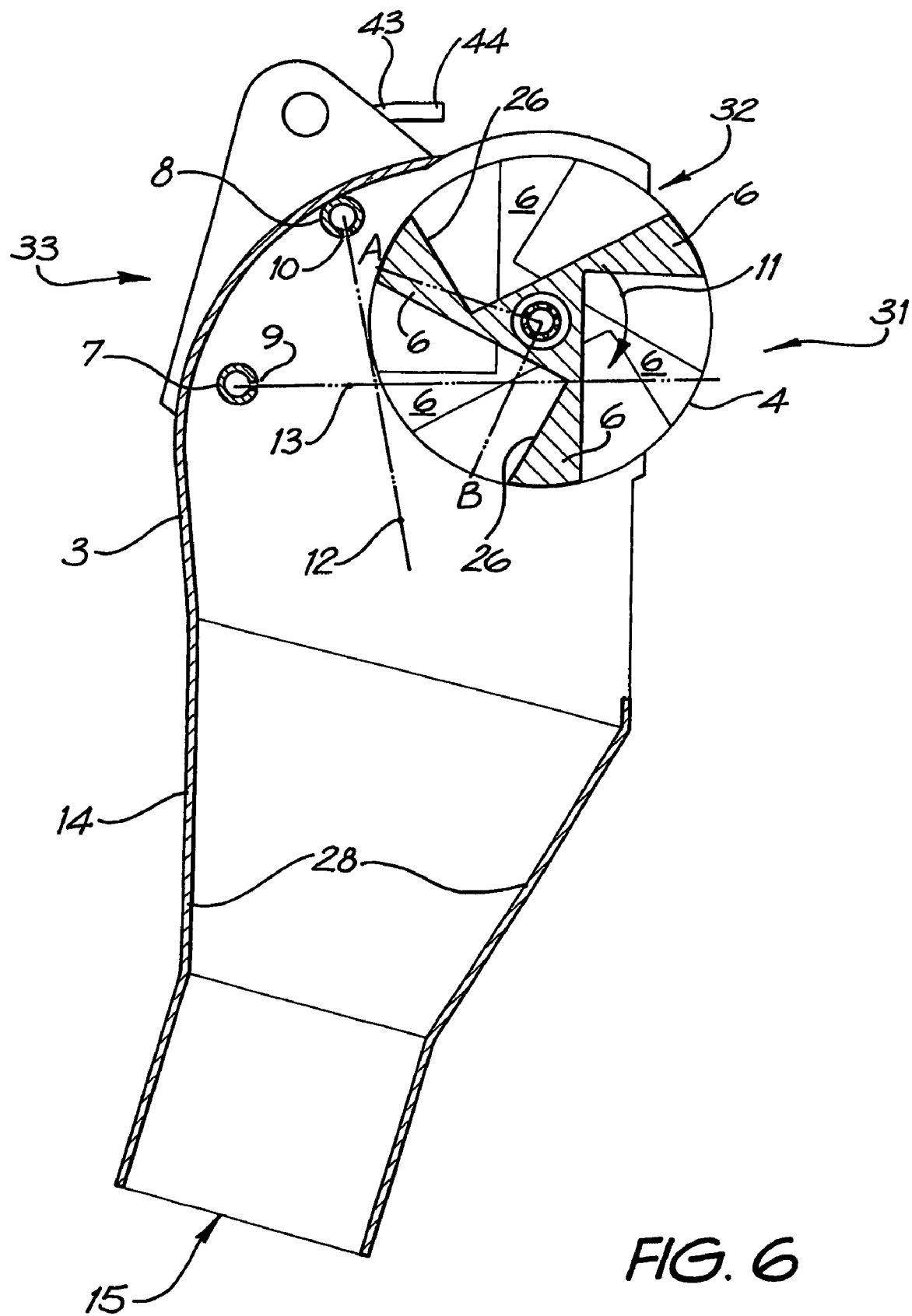
FIG. 6 is a schematic side section through the dedagging implement.
Figure 7:
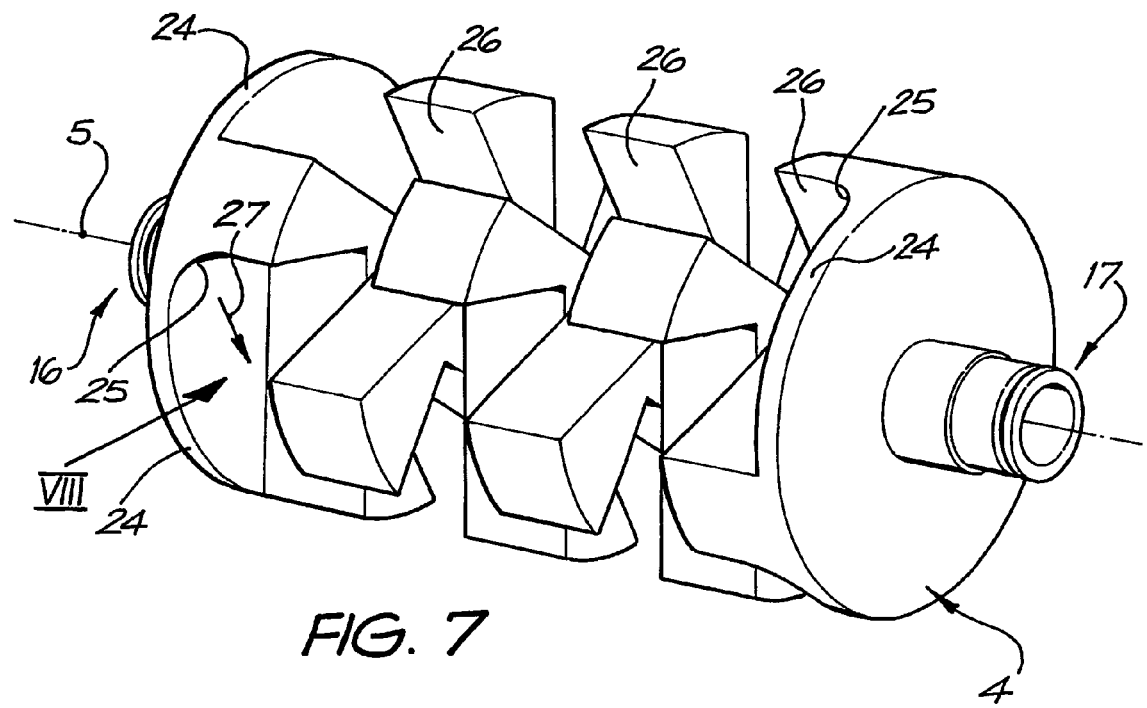
FIG. 7 is a perspective view of the rotor of the dedagging implement.
Figure 8:
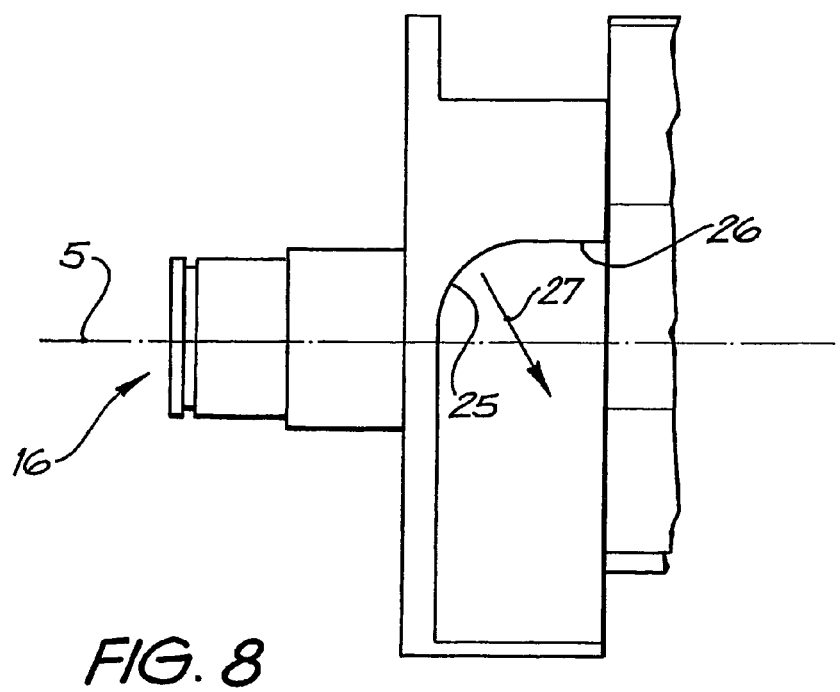
FIG. 8 is a detail of a lobe of the rotor of FIG. 7 viewed in the direction of arrow VIII.

Located on each handle 29 is a respective actuating switch 34 (see FIG. 4) for activating a hydraulic motor 35 which turns rotor 4. Motor 35 is keyed to rotor 4 and can provide 3 HP at 1500 RPM. Switches 34 are each in the form of levers which are deployed by pulling them rearwardly. The switches are pneumatically connected to each other by a flexible tube 36.

Switches 34 are also pneumatically connected to an electronic circuit (not shown) by flexible tubes 37. The circuit only activates motor 35 when switches 34 are both deployed. This is an additional feature to ensure that both of the operator's hands are kept away from lobes 6. In addition, the circuit ensures that motor 35 is not activated unless switches 34 are deployed within one second of each other. As a result of this one second time lag capability, it is not necessary to deploy switches 34 exactly simultaneously which could prove difficult. However, this time lag is sufficiently short to assist in ensuring that the operator's hands are both in place on handles 29 and therefore that implement 1 is positioned correctly for use before rotor 4 is switched on.

In use, switches 34 are deployed and implement 1 moved over the surface of a carcass so that lobes 6 remove dags from the carcass. As the lobes rotate, they draw the dag material through opening 32 into housing 3. The shape of lobes 6, and particularly their leading faces 26 assists in projecting dag, which has been removed from the carcass, towards the vacuum outlet 15 rather than radially inwardly with respect to rotor 4. Had lobes 6 been shaped differently so that matter was directed radially inwardly, this would contribute to a build-up of dag material on the rotor.

Deployment of switches 34 also opens valves (not shown) which permits passage of air from a compressed air supply (not shown) attached to implement 1 at an air supply connection 38.1. The air passes through air piping (not shown) into air supply pipe 8 and exits the pipe through apertures 10 towards rotor 4 as described above. The air pressure is adjustable by rotation of adjusting knob 39.

The air also provides a pneumatic source for a pneumatically operated water valve 40. When a thumb-button 41, located adjacent to one of the handles 29, is depressed by the operator, a flow of air to water valve 40 is created via a connecting pipe 42, which opens the valve. This, in turn, permits passage of water from a water supply (not shown) though water supply connection 38.2. This water passes through water piping (not shown) into water supply pipe 7. The water exits pipe 7 through apertures 9 towards rotor 4 as described above. The flow of water to rotor 4 is effective for dislodging and flushing dag material and mud that has built up on lobes 6. Furthermore, the rotation of the rotor causes the flow of water to be atomised, to produce a fine mist. This wets dry or dusty dag matter, which facilitates flushing.

The flow of air from apertures 10 past or just skimming rotor 4 also dislodges dag material and water droplets from lobes 6. It blows this material, as well as the mist that has formed, and dust produced by the dag material, towards, and into the path of, the flow of water from pipe 7. This results in a turbulent mixing of the water with the dag matter. It further results in the dag matter being washed against the walls 28 of vacuum chute 14 and towards vacuum outlet 15. This is assisted by the air flow diverting the water flow, at least to some extent, towards the outlet. Chute 14 is essentially funnel-shaped to permit the flushed matter to flow smoothly and to be concentrated at the vacuum outlet 15.

The flow of air, because of its high pressure, also tends to neutralise the flow of air induced in an opposite direction by rotation of rotor 4 and its lobes 6, which induced flow would otherwise cause more dag matter to be deposited on the rear wall of housing 3. In addition, the blast of air which would be ejected through opening 32 as a result of the induced flow, is also neutralised.

Some of the water sprays against the walls of housing 3. This reduces the ability of dag material, especially sticky summer dag, to stick to the housing walls. Furthermore, it tends to wash material which has stuck to the walls towards outlet 15. This is a particularly important feature in respect of some of the heavier dag material which, because of its weight, is flung from rotor 4 against the walls of housing 3 due to the rotor's rotational motion.

The combination of a water flow and an air flow renders implement 1 suitable for removing both dry, hard winter dag and sticky summer dag from a carcass.

Water pipes 43 having end nozzles 44 are also connected to the water supply by piping (not shown). Water therefore flows from pipes 43 when button 41 is depressed. Pipes 43 are shaped and angled such that the water can be sprayed through nozzles 44 direct onto a carcass. This enables the carcass to be washed down and rinsed as dag is being removed and also when rotor 4 is not rotating.

Depressing button 41 also establishes a flow of water to passages 21, for flushing those parts of rotor 4 adjacent to bearings 18.

A vacuum system 45 includes a vacuum motor 46, a vacuum pump 47 driven by motor 46, a vacuum exhaust 48 and a cyclone vacuum tank 49. Tank 49 is connected to a waste collection chamber 50 by an opening which constitutes an inlet 51 to the chamber. Chamber 50 also has another opening which constitutes an outlet 52. Inlet 51 and outlet 52 are each provided with a closure valve 53 and 54 respectively. Valve controls (not shown) are provided for opening valve 53 when valve 54 closes, and vice versa.

Tank 49 is attached to implement 1 by piping connected between a vacuum pipe 55 and vacuum outlet 15. It will therefore be appreciated that vacuum outlet 15 effectively constitutes an inlet to pipe 55 and hence to tank 49. When implement 1 is in use, pump 47 creates a cyclone effect in tank 49 which draws dag material and other contaminant matter from housing 3 through vacuum outlet 15 and pipe 55 into tank 49. During one phase of operation, valve 53 is generally open and waste moves from tank 49 into chamber 50. When chamber 50 has been filled to a predetermined extent, the valve controls close valve 53 and open valve 54, and another phase of operation begins. In this other phase, the waste matter which has accumulated in chamber 50 is removed through outlet 52. The manner of removal does not form part of the invention and is not described.

Once the waste has been removed, the valve controls close valve 54 and open valve 53, to activate the first phase once again. Accordingly, the phases alternate with each other. This permits removal of waste matter without necessitating stopping the operation of implement 1.

Vacuum 45 system and the air supply to implement 1 are provided with respective control systems which shut off the vacuum pump and air supply respectively, when the implement has been idle for longer than four minutes. This provides for greater safety when the implement is unattended and for preservation of energy.

Figure 13:
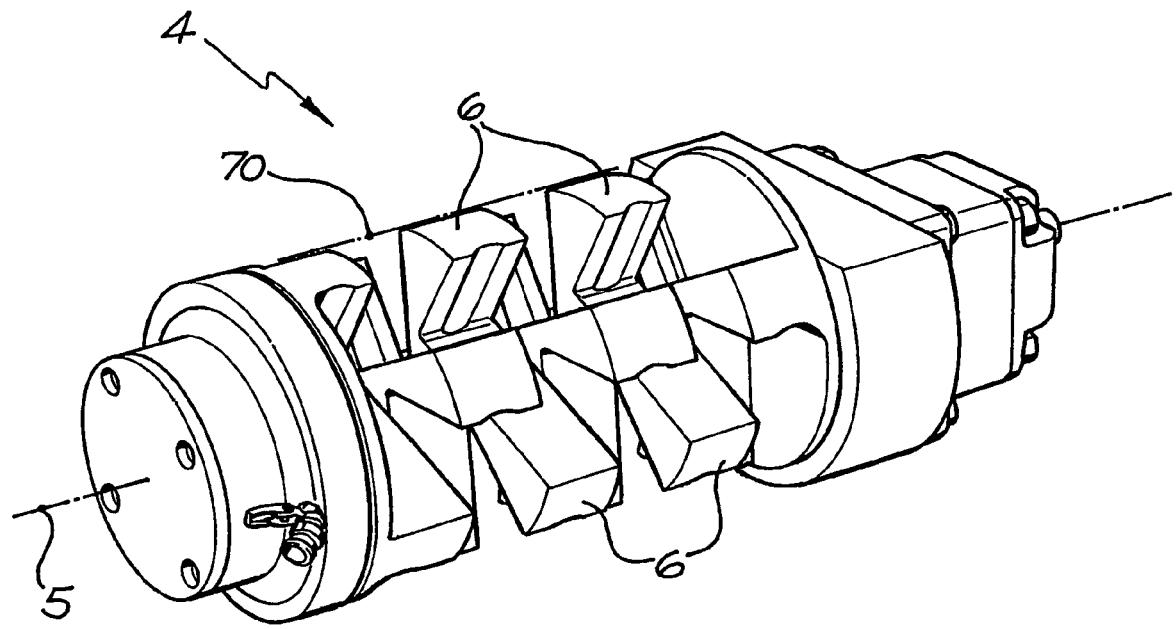
FIG. 13 is a perspective view of the rotor of the dedagging implement of FIG. 1.
Figure 14:
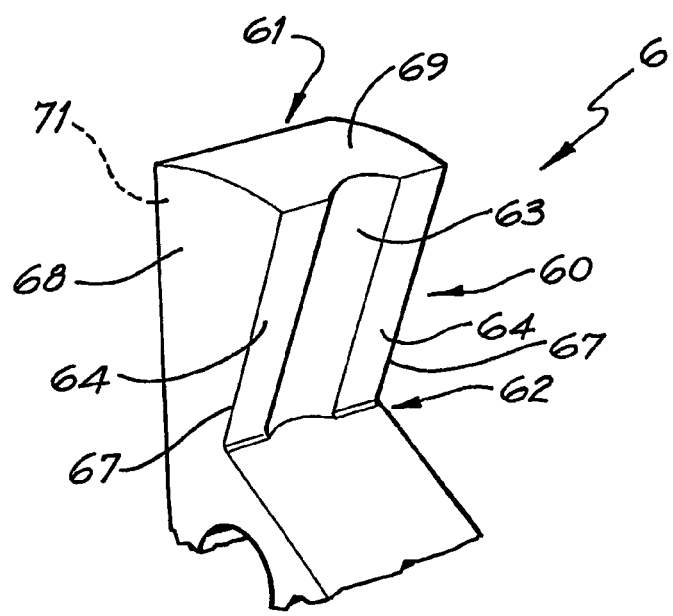
FIG. 14 is a perspective view of one of the lobes of the rotor of FIG. 13.

Turning now to FIGS. 13 and 14, rotor 4 is shown in detail. Each lobe 6 has a leading face 60 with respect to the operational direction of the rotor about axis 5. Each face 60 extends from a first end 61 corresponding to a radially outer extremity of the respective lobe 6 to a second end 62 closer to axis 5. As will be discussed in more detail below, faces 60 are configured to facilitate the outward movement of dag material by centrifugal force from rotation of rotor 4.

It will be appreciated that each face 60 is substantially straight along its extent in a direction from the respective first end 61 to the respective second end 62. Furthermore, each face 60 is substantially planar in a direction parallel to axis 5. An elongate groove is 63 defined in each face 60, and extends from the respective first end 61 towards the second end 62. Accordingly, the structure of each lobe 6 is such that each face 60 defines a pair of straight elongate coplanar planar portions 64 disposed on opposite sides of the groove 63 and these planar portions each extend from the first end 61 towards said second end 62.

Figure 15:
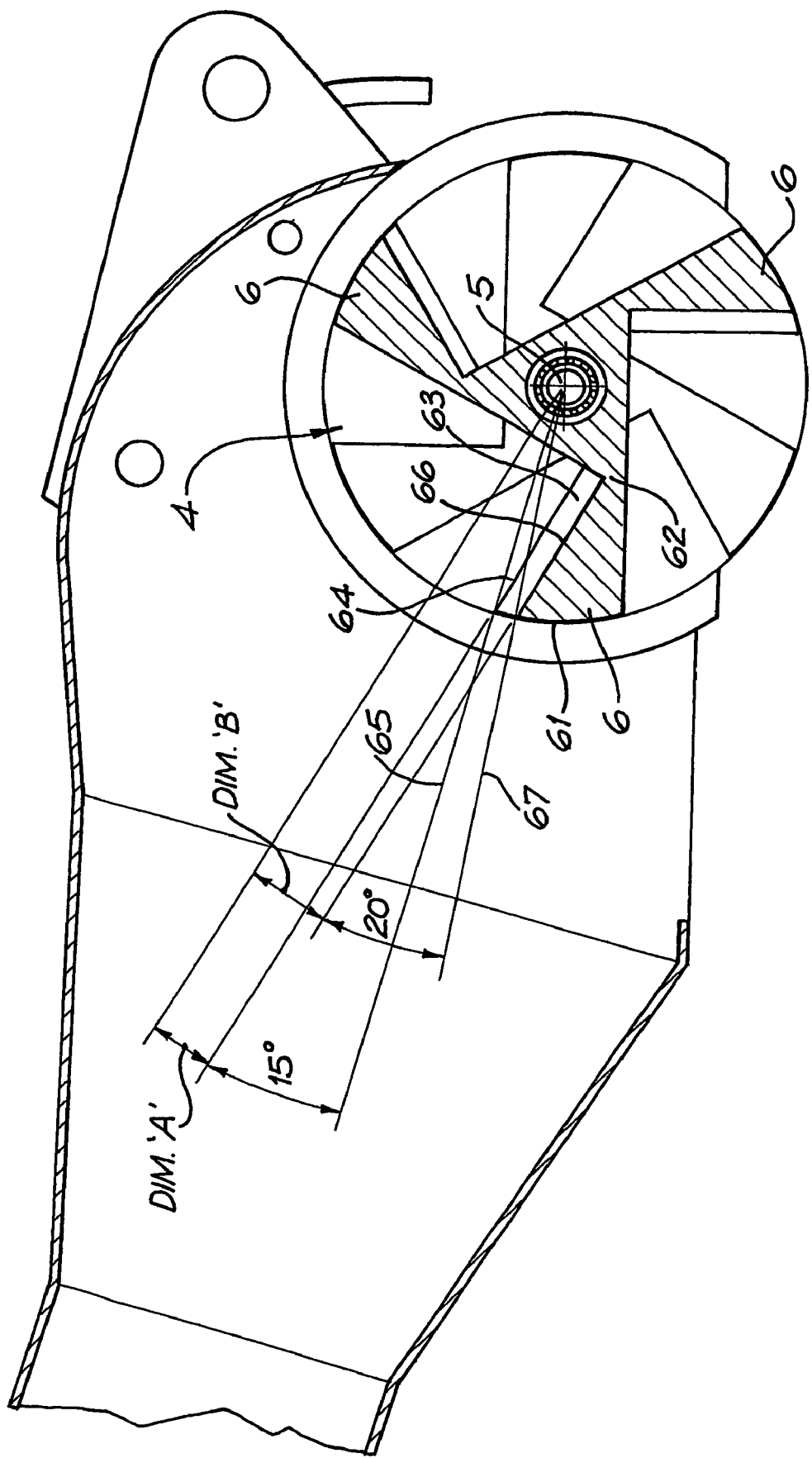
FIG. 15 is a schematic side section through the dedagging implement.

The section shown in FIG. 15 includes a section through rotor 4, which bisects three of the lobes 6 at the center of their respective grooves 63. It will be seen that each planar portion 64 intersects, at an angle of 15 degrees, a line 65 which extends in a plane perpendicular to axis 5 and radially from the axis to the first end 61. Furthermore, a line 66 running along the trough of each groove 63 intersects, at an angle of 20 degrees, a line 67 which extends in a plane perpendicular to axis 5 and radially from the axis to the first end 61. These angles are due to the offset, from axis 5, of the planar portions 64 and the troughs of the grooves 63, the offsets being represented by dimensions Dim 'A' and Dim 'B', respectively.

In use, when dag material is removed from a carcass by the lobes 6, the material tends to stick to the lobes. This results in an accumulation of dag material on the lobes which causes fouling and necessitates periodic cleaning.

Countering the tendency of dag material to stick to lobes 6 is the effect of rotation of rotor 4, which tends to cause the dag material to be flung away from the lobes. This, in turn, results from the height of dag material that has built up on the lobes, the mass of the accumulated dag material, and the centrifugal force on the dag material caused by rotation of rotor 4. It is, of course, desirable to facilitate such ejecting of dag material from the lobes towards vacuum chute 14.

The action of lobes 6 against the carcass, and the impact between faces 60 and the dag material results in this material being deposited on the faces at positions somewhat spaced from the radially outer extremities of the lobes—that is, radially inwards of these extremities. It will be appreciated that the radially inward position of such depositing results in a smaller centrifugal effect on the dag material than would have been the case if the material had been deposited further outwards. This, in turn, reduces the tendency of the dag material to be flung or ejected from lobes 6. However, the substantially straight configuration of faces 60, and the presence of grooves 63, facilitates sliding of the dag material radially outwards along the faces. The tendency to slide outwards is enhanced at grooves 63 due to the greater mass of material that is able to accumulate there as a result of the depth of the grooves.

As the material moves outwards, the centrifugal force on it increases and this, in turn, increases the tendency of the material to be ejected from faces 60.

It has been found that the angles of grooves 63 and planar portions 64 relative to radially extending lines 65 and 67 provides an efficient balance between effective and positive removal of the dag material from the carcass, and ejection of the material from lobes 6.

As rotor 4 rotates, not all of the dag material removed from the carcass is effectively "caught" by the lobe that removes the material. Some of the material is able to move past the side edges 67 of face 60 of this lobe, effectively bypassing the lobe. However, this is largely addressed by the configuration of lobes 6 with respect to one another. The plurality of lobes are positioned successively along axis 5, with each lobe 6 being spaced circumferentially about the axis from each immediately adjacent lobe. Each lobe 6 has a pair of opposed planar sidewalls 68 intersected, at edges 67, by the respective face 60 of the lobe. The interposed sidewalls 68 of each pair of adjacent lobes 6 are coplanar with respect to each other. Thus, as the dag material bypasses edges 67 of one face 60, it is effectively "caught" by the next successive lobe 6 as rotor 4 rotates. The co-planar sidewalls 68 of adjacent lobes 6 reduce the chance that the dag material will weave between, and bypass, successive lobes 6.

Rotor 4 is manufactured using an initial cylindrically shaped form from which the rotor is machined. This results in each lobe 6 having a radially outer surface 69, constituting the so-called first end 61 of the lobe, which forms part of the initial cylinder, as shown in broken lines 70 in FIG. 13. It will be appreciated that axis 5 effectively constitutes the axis of this cylinder.

The thickness of each lobe 6, between face 60 and an opposed surface 71 of the lobe, tapers in a direction from first end 61 towards second end 62. This is as a result of the manner in which rotor 4 is machined initially. However, it results in a rotor which consist of significantly less material, and which is therefore significantly lighter, than would have been the case had lobes 6 not been tapered, while still providing each lobe with sufficient strength to remove dag material without braking off from the remainder of the rotor.

Although the invention has been described with reference to a specific embodiment, it will be appreciated by those skilled in the art that it may be embodied in many other forms.

The claims defining the invention are as follows:

1. A dedagging implement including:
   a body;
   a rotor supported on the body for rotation about an axis and having radially outwardly projecting lobes for removing dag from a carcass;

a liquid supply means located on the body, said liquid supply means being configured to direct a flow of liquid at the lobes;

an air supply means located on the body, said air supply means being configured to direct air flow at, or in close proximity to, the lobes.

2. The dedagging implement of claim 1, wherein the rotor and lobes constitute a single integral element.

3. The dedagging implement of claim 1, wherein the rotor is supported on the body by at least one bearing, and the rotor includes a barrier adjacent to the bearing for obstructing passage of dag material from the lobes to the bearing, thereby inhibiting contamination of the bearing.

4. The dedagging implement of claim 3, wherein the rotor is supported by a pair of bearings, each bearing having a corresponding barrier adjacent thereto.

5. The dedagging implement of claim 3 wherein the barrier is a disk-like formation.

6. The dedagging implement of claim 1, further including drive means for rotating the rotor.

7. The dedagging implement of claim 6, wherein the drive means is a hydraulic motor.

8. The dedagging implement of claim 6, further including two actuating switches, wherein both switches must be deployed in order to activate the drive means.

9. The dedagging implement of claim 8 further including two spaced-apart handles for supporting the implement, wherein the actuating switches are located on each handle.

10. The dedagging implement of claim 1, wherein the dedagging implement is mounted on a robotic arm, said robotic arm being controlled by a computer programmed to operate the dedagging implement.

11. The dedagging implement of claim 1, further including liquid spraying means mounted to the body and configured for spraying liquid directly onto a carcass in use.

12. The dedagging implement of claim 1, wherein the rotor is configured to be supported for rotation about the axis in an operational direction of rotation, and includes at least one lobe having a leading thee with respect to said operational direction, said face extending from a first end corresponding to a radially outer extremity of the lobe to a second end closer to the axis, and being configured to facilitate outward movement of dag along the face by centrifugal force from rotation of the rotor.

13. The dedagging implement of claim 12, wherein the face intersects a line extending in a plane perpendicular to said axis and radially from said axis to said second end, at angle of between 10 and 25 degrees.

14. A dedagging system including a dedagging implement according to claim 1 and a vacuum waste collection system connected to the implement.

15. The dedagging system of claim 14 wherein hit vacuum system includes a waste collection chamber having a inlet opening, an outlet opening and respective closure means for selectively closing the openings, wherein the system is configured to permit dag material to be drawn from the implement into the chamber through the inlet opening during a first phase while the outlet opening is closed by its closure means, and to permit removal of dag material from the chamber through the outlet opening while the inlet opening it closed by its closure means.

* * * * *

UNITED STATES PATENT AND TRADEMARK OFFICE
CERTIFICATE OF CORRECTION

| | | |
|---|---|---|
| PATENT NO. | : 7,326,107 B2 | Page 1 of 1 |
| APPLICATION NO. | : 10/493085 | |
| DATED | : February 5, 2008 | |
| INVENTOR(S) | : Andrew L. Finney et al. | |

It is certified that error appears in the above-identified patent and that said Letters Patent is hereby corrected as shown below:

In the Claims:

At Column 12, line 7, "thee" should be -- face --.

Signed and Sealed this
Fourteenth Day of June, 2011

David J. Kappos
*Director of the United States Patent and Trademark Office*